2 Sheets—Sheet 1.

H. RIESEL,

Assignor of one-half to S. B. STEERS.

BALE EJECTOR FOR PRESSES.

No. 9,897. Reissued Oct. 18, 1881.

Witnesses;

J. Walter Fowler,
Chas J. Gooch

Inventor;

Henry Riesel
by
H. H. Kerr
Attorney

N. PETERS, Photo-Lithographer, Washington, D. C.

2 Sheets—Sheet 2.

H. RIESEL,

Assignor of one-half to S. B. STEERS.

BALE EJECTOR FOR PRESSES.

No. 9,897. Reissued Oct. 18, 1881.

Witnesses:

F. Walter Fowler,
Chas J. Gooch

Inventor;

Henry Riesel by
H. H. Kerr
Attorney

N. PETERS, Photo-Lithographer, Washington, D. C.

UNITED STATES PATENT OFFICE.

HENRY RIESEL, OF GALVESTON, TEXAS, ASSIGNOR OF ONE-HALF TO SCHUYLER B. STEERS, OF NEW ORLEANS, LOUISIANA.

BALE-EJECTOR FOR PRESSES.

SPECIFICATION forming part of Reissued Letters Patent No. 9,897, dated October 18, 1881.

Original No. 235,295, dated December 7, 1880. Application for reissue filed September 1, 1881.

*To all whom it may concern:*

Be it known that I, HENRY RIESEL, of Galveston, in the county of Galveston and State of Texas, have invented certain new and useful Improvements in Bale-Ejectors for Compresses, of which the following is a specification.

This invention relates to certain improvements in cotton-bale compresses, and has for its object to provide devices whereby the bale, after being compressed, will be automatically ejected from the press. I attain these objects by mechanism illustrated in the accompanying drawings, in which—

Figure 1:
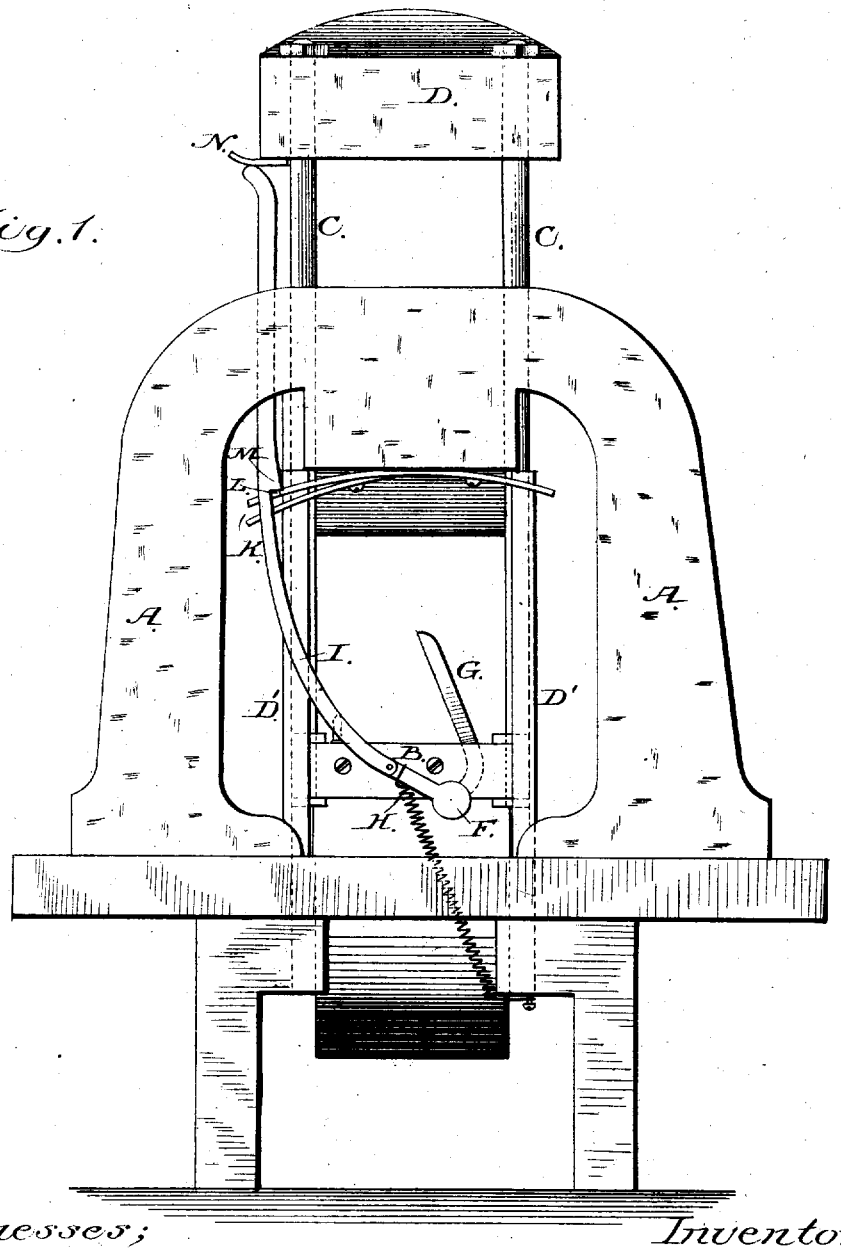
Figure 2:
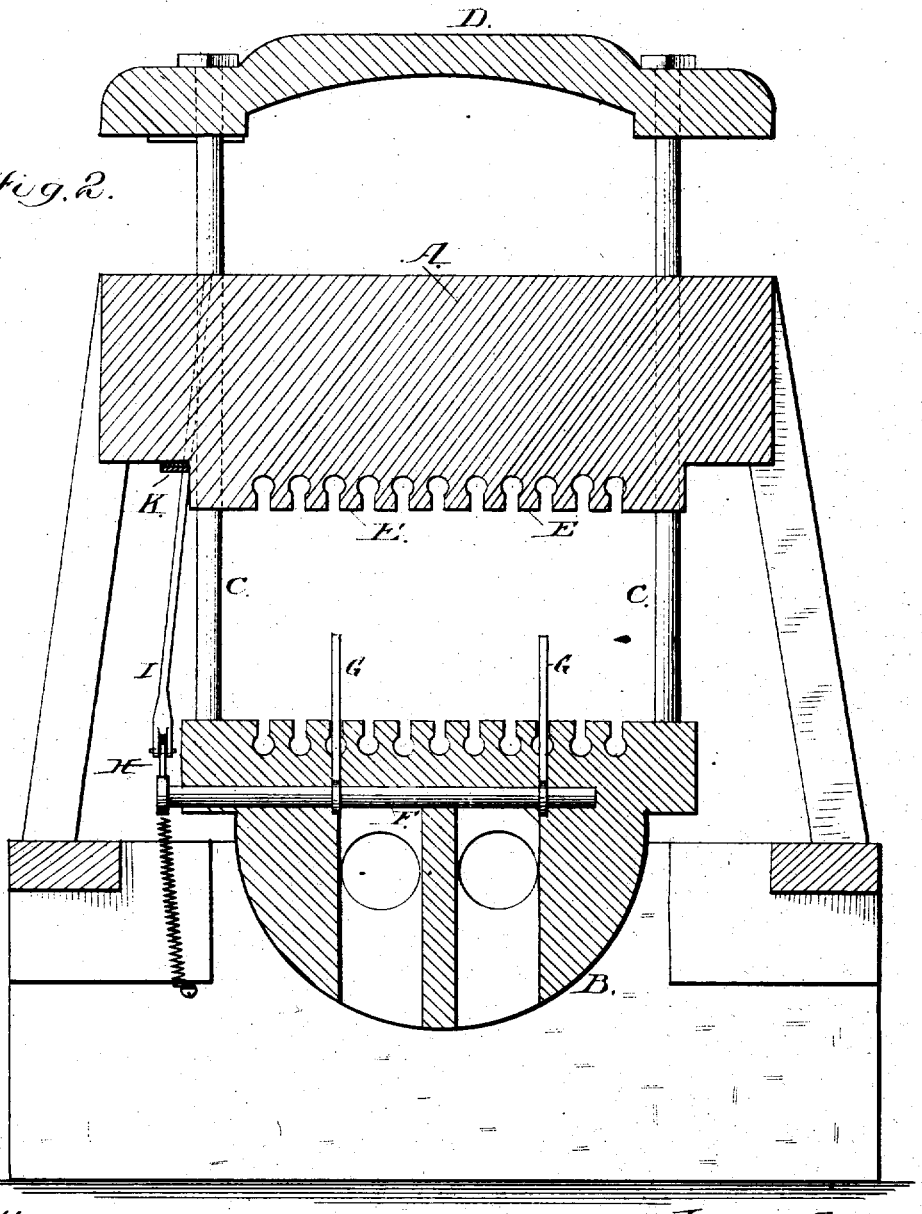

Figure 1 is an end view of the compress, representing the apparatus in position to eject the bale; and Fig. 2 is a longitudinal sectional view of compress and ejector.

Similar letters refer to similar parts in the two views.

The letter A indicates the frame of the compress, which may be either a hydraulic or steam compress.

The letter B indicates the lower platen or follower, which has secured to its corner the vertical rods C C, which pass upward through guideways in the upper part of the frame, and are adapted to travel back and forth in the same vertically. The upper ends of the said rods connect with a suitable cross-bar, D, by means of which the lower platen may be connected with any operating mechanism by which it can be raised and lowered. The lower platen is at its corners confined between vertical guideways D′, secured to the machine, and travels up and down therein.

The letter E indicates the usual channel-bars of the upper and lower platens.

The letter F indicates a shaft extending longitudinally through the lower platen below the level of the channel ways or grooves, and to said shaft are keyed the bent arms G, each of which lies in the channel-ways between the channel-bars E. The shaft F at one end extends beyond its bearings, and is provided with a crank, H, as shown. The said crank, like the arms G, is securely keyed to the shaft, so that all will move together without any possibility of either slipping.

To the end of the crank H is pivoted a bar, I, which extends upward through a slotted guide, K, secured to the frame at any convenient part thereof. The rear edge of the slot in said guide forms a detent, L, which engages the hook M on the bar I when the follower or platen has been fully elevated and is returning on its downward stroke, so as to operate the shaft F, and by means of the shaft the arms G to discharge the bale. The bar above the hook is gradually beveled to the free end, so as to permit the hook to be thrown over the detent as the platen is elevated.

The letter N indicates a trip, secured to the cross-piece which is attached to the rods C, the office of which is to move the bar I so as to release the hook when the platen is completing the downward movement, in order to allow the parts to assume their normal position, ready for the next bale.

The operation of my improved ejector will be readily understood in connection with the above description, and is as follows: When the platen is down the arms G lie within grooves between their respective channel-bars. Upon elevating the platen the bar I will travel up through the guide K until the hook M passes the detent L. Upon the return of the platen to release the compressed bale the hook M will engage the detent L, which will cause the shaft F to rotate, partially elevating the arms G, so as to eject the bale. When the trip N comes in contact with the upper end of the bar I it will shift the same, releasing the hook from the detent and permitting the parts to assume a normal position with the bars G between their respective channel-bars.

What I claim is—

1. The longitudinally-extending shaft F, bale-ejecting arms G, rigidly keyed thereto, the crank-arm H, rigidly attached to the outer end of said shaft, and means for operating said crank-arm.

2. The combination of the platen B, secured between and traveling in ways or guides D′, and provided with vertical rods C, secured to a cross-piece, D, the shaft F, provided with keyed arms G, extending between the channel-bars of the platen, the crank H, secured to said shaft, the hooked bar I, extending through a guide, K, and adapted to engage the detent L thereof, and the trip N, secured to the cross-piece D, the whole constructed to operate substantially in the manner specified.

HENRY RIESEL.

Witnesses:
H. C. LIMKE,
R. L. FULTON.